(12) United States Patent
Kawatoko et al.

(10) Patent No.: US 10,520,336 B2
(45) Date of Patent: Dec. 31, 2019

(54) DISPLACEMENT DETECTOR

(71) Applicant: Mitutoyo Corporation, Kawasaki, Kanagawa (JP)

(72) Inventors: Osamu Kawatoko, Toride (JP); Masaki Matsushita, Kawasaki (JP)

(73) Assignee: MITUTOYO CORPORATION, Kawasaki (JP)

( * ) Notice: Subject to any disclaimer, the term of this patent is extended or adjusted under 35 U.S.C. 154(b) by 80 days.

(21) Appl. No.: 15/869,845

(22) Filed: Jan. 12, 2018

(65) Prior Publication Data
US 2018/0216971 A1    Aug. 2, 2018

(30) Foreign Application Priority Data

Feb. 2, 2017 (JP) .................. 2017-017378

(51) Int. Cl.
*G01D 5/241* (2006.01)
(52) U.S. Cl.
CPC .................. *G01D 5/2415* (2013.01)
(58) Field of Classification Search
CPC .................. G01D 5/2415; G01B 7/02
See application file for complete search history.

(56) References Cited

U.S. PATENT DOCUMENTS

| | | | | |
|---|---|---|---|---|
| 4,420,754 A * | 12/1983 | Andermo | ............. | G01D 5/2415 324/660 |
| 5,440,501 A * | 8/1995 | Shimomura | ......... | G01D 5/2415 324/662 |
| 5,729,514 A * | 3/1998 | Horigome | ............. | G11B 20/22 369/107 |
| 5,977,781 A * | 11/1999 | Jordil | .................. | G01D 5/2415 324/658 |
| 9,781,254 B1 * | 10/2017 | Anim-Appiah | ......... | H04M 3/34 |
| 2003/0030816 A1 * | 2/2003 | Eom | .................... | G01B 9/0201 356/486 |
| 2007/0041289 A1 * | 2/2007 | Mitsuda | ............. | G11B 7/08511 369/44.29 |
| 2010/0037691 A1 * | 2/2010 | Jeong | ................. | G01C 19/5719 73/504.12 |
| 2014/0300425 A1 * | 10/2014 | Cazzaniga | ......... | G01C 19/5776 331/154 |
| 2017/0019138 A1 * | 1/2017 | Hitomi | ................. | H04B 1/0458 |

FOREIGN PATENT DOCUMENTS

JP    H02-269908    11/1990

* cited by examiner

*Primary Examiner* — Dominic E Hawkins
(74) *Attorney, Agent, or Firm* — Rankin, Hill & Clark LLP

(57) ABSTRACT

The displacement detector is configured to receive a transmission signal output from a transmission signal output unit by a reception electrode disposed in a detection head to detect a displacement between the detection head and a scale based on the received signal. The transmission signal is transmitted from a transmission electrode disposed in the detection head to the reception electrode through a coupling electrode disposed in the scale. Phase adjustment units generates a signal whose phase is adjusted from the transmission signal output from the transmission signal output unit. An amplitude adjustment unit adjusts an amplitude of the signal whose phase is adjusted by the phase adjustment unit to generate a crosstalk correction signal. A demodulation unit samples a signal generated by synthesizing the crosstalk correction signal and the received signal and to demodulate the sampled signal.

10 Claims, 9 Drawing Sheets

DISPLACEMENT DETECTOR

INCORPORATION BY REFERENCE

This application is based upon and claims the benefit of priority from Japanese patent application No. 2017-17378, filed on Feb. 2, 2017, the disclosure of which is incorporated herein in its entirety by reference.

BACKGROUND

The present invention relates to a displacement detector.

Recently, a displacement detector (or an encoder) has been widely used as one of apparatuses measuring a displacement. The displacement detectors of various detection types such as a capacitive type and an optical type are used. For example, a linear encoder that is an example of the displacement detector includes a scale and a detection head moving along the scale, and detects a displacement between the scale and the head.

In general capacitive displacement detectors, it is known that an undesirable transmission signal interferes with a received signal and thereby crosstalk occurs when detecting the displacement. Therefore, accuracy of displacement detection deteriorates. On the other hand, a method for correcting the crosstalk has been proposed (Japanese unexamined patent publication No. 2-269908). In this method, the crosstalk is cancelled at a reception electrode by adjusting an amplitude of a signal having a phase opposite to a phase of a signal input through a capacitance of an unnecessary path and inputting the adjusted signal as a correction signal to the reception electrode.

SUMMARY

In Japanese unexamined patent publication No. 2-269908, the correction signal having a phase opposite to a phase of a signal input to a transmission electrode is generated by an inverter. However, in order to correct the crosstalk with high accuracy, the phase of the correction signal needs to be precisely adjusted. Thus, in order to more precisely adjust capacitance values of cancellation capacitors, the number of the cancellation capacitors disposed in parallel increases. In other words, in order to improve a phase adjustment function of the correction signal, it is unavoidable to increase a circuit scale.

The present invention has been made in view of the above-described circumstances and an object of the present invention is to suppress or remove crosstalk of a capacitive displacement detector with a simple configuration.

A first exemplary aspect of the present invention is a displacement detector, the displacement detector being a capacitive displacement detector configured to receive a transmission signal output from a transmission signal output unit by a reception electrode disposed in a detection head to detect a displacement between the detection head and a scale based on the received signal, the transmission signal being transmitted from a transmission electrode disposed in the detection head to the reception electrode through a coupling electrode disposed in the scale, the displacement detector including: phase adjustment units configured to generate a signal whose phase is adjusted from the transmission signal output from the transmission signal output unit; an amplitude adjustment unit configured to adjust an amplitude of the signal whose phase is adjusted by the phase adjustment unit to generate a crosstalk correction signal; and a demodulation unit configured to sample a signal generated by synthesizing the crosstalk correction signal and the received signal and to demodulate the sampled signal.

A second exemplary aspect of the present invention is the above-described displacement detector, in which the phase adjustment units adjust a voltage of the transmission signal by capacitive voltage division based on a predetermined condition and synthesizes the adjusted voltages to generate a signal having a phase opposite to a phase of crosstalk included in the received signal, and the amplitude adjustment unit causes an amplitude of the signal generated by the phase adjustment units to coincide with an amplitude of the crosstalk based on a predetermined condition to generate the crosstalk correction signal.

A third exemplary aspect of the present invention is the above-described displacement detector, in which the phase adjustment unit includes a plurality of first capacitors, one end of the first capacitor being connected to an input of the amplitude adjustment unit, and the number of the first capacitors the other ends of which receive the transmission signal in the plurality of first capacitors are controlled in response to a first control signal.

A fourth exemplary aspect of the present invention is the above-described displacement detector, in which capacitance values of the plurality of first capacitors are different from each other.

A fifth exemplary aspect of the present invention is the above-described displacement detector, in which the amplitude adjustment unit includes a plurality of second capacitors, and the amplitude adjustment unit is configured to be capable of changing the number of the second capacitors connected between the demodulation unit and the amplitude adjustment unit in the plurality of second capacitors.

A sixth exemplary aspect of the present invention is the above-described displacement detector, including a plurality of first switches inserted between the amplitude adjustment units and the plurality of second capacitors or between the demodulation unit and the plurality of second capacitors, the plurality of first switches being configured to be opened and closed in response to a second control signal, in which the number of the first switches to be closed in the plurality of first switches is controlled in response to the second control signal.

A seventh exemplary aspect of the present invention is the above-described displacement detector, in which the demodulation unit samples a voltage of a signal detection capacitor that is charged by the signal generated by synthesizing the received signal and the crosstalk correction signal in response to a sampling signal, and discharges charge that is charged in the signal detection capacitor in response to a discharge signal.

An eighth exemplary aspect of the present invention is the above-described displacement detector, including a plurality of second switches connected to a demodulation unit side end of each of the plurality of second capacitors and the ground, in which the plurality of second switches are simultaneously opened in response to the discharge signal, or the number of the second switches to be closed in the plurality of second switches can be controlled in response to the second control signal.

A ninth exemplary aspect of the present invention is the above-described displacement detector, including a plurality of AND circuits, the second control signal being input to one end of the AND circuit, the sampling signal being input to the other end of the AND circuit, and opening and closing of the plurality of first switches being respectively controlled in response to output signals the plurality of AND circuits; and a plurality of OR circuits, the discharge signal being input to one end of the OR circuit, a reversed signal of the second control signal being input to the other end of the OR circuit, and opening and closing of the plurality of second switches being respectively controlled in response to output signals of the plurality of OR circuits.

A tenth exemplary aspect of the present invention is the above-described displacement detector, in which the amplitude adjustment unit includes: a plurality of third switches, opened and closed in response to a third control signal, one end of each of the plurality of third switches being connected to an output of the phase adjustment unit; and a plurality of third capacitors, one end of each of the plurality of third switches being respectively connected to the other ends of the plurality of third switches, and the other ends of the plurality of third switches being connected to the ground, the number of third switches to be closed in the plurality of third switches is controlled in response to the third control signal.

According to the present invention, it is possible to suppress or remove crosstalk of a capacitive displacement detector with a simple configuration.

The above and other objects, features and advantages of the present invention will become more fully understood from the detailed description given hereinbelow and the accompanying drawings which are given by way of illustration only, and thus are not to be considered as limiting the present invention.

DESCRIPTION OF EMBODIMENTS

Exemplary embodiments according to the present invention are explained hereinafter with reference to the drawings.

The same symbols are assigned to the same components throughout the drawings, and their duplicated explanations are omitted as appropriate.

First Exemplary Embodiment

Figure 1:
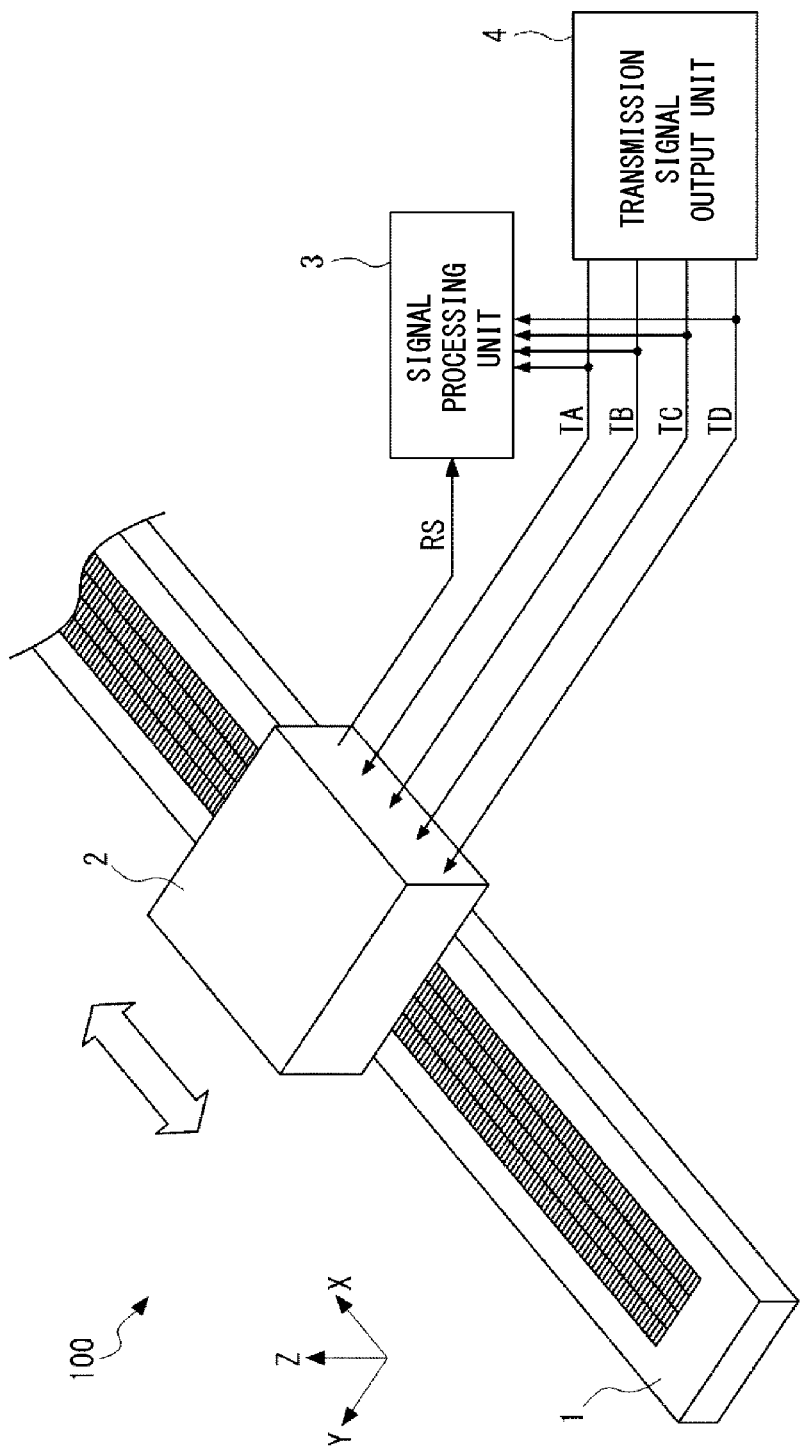
FIG. 1 schematically illustrates a configuration of a displacement detector according to a first exemplary embodiment.

A displacement detector 100 according to a first exemplary embodiment will be described. FIG. 1 schematically illustrates a configuration of the displacement detector 100 according to the first exemplary embodiment. The displacement detector 100 includes a scale 1, a detection head 2, a signal processing unit 3, and a transmission signal output unit 4. The scale 1 and the detection head 2 are configured to be relatively movable in a displacement measurement direction. Hereinafter, the measurement direction will be described as an X direction. A principal surface of the scale 1 and the detection head 2 is an X-Y plane parallel to the X direction and a direction perpendicular to the X direction. The scale 1 and the detection head 2 are separately disposed in a Z direction perpendicular to the X direction and a Y direction.

Figure 2:
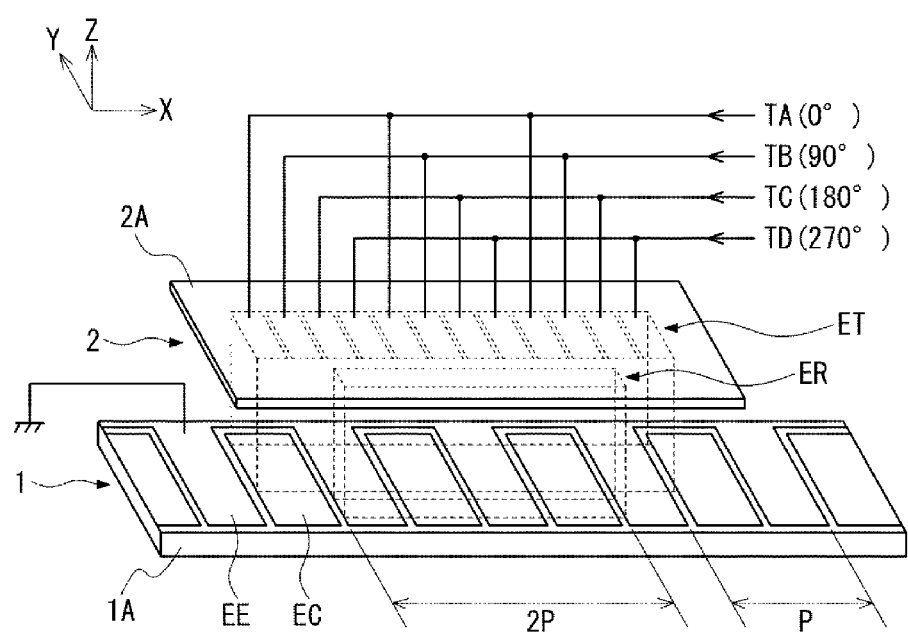
FIG. 2 illustrates an arrangement of electrodes of a scale and a detection head.

FIG. 2 illustrates an arrangement of electrodes of the scale 1 and the detection head 2. The scale 1 includes a plate-like member 1A whose principal surface is the X-Y plane and whose longitudinal direction is the X direction. On the plate-like member 1A, coupling electrodes and earth electrodes are disposed to be arranged in the X direction. In this example, the coupling electrode EC and the earth electrode EE are alternately arranged along the X direction at a period P. The coupling electrode EC and the earth electrode EE are electrically insulated and the earth electrode EE is grounded.

The detection head 2 includes a plate-like member 2A whose principal surface is the X-Y plane. On the plate-like member 2A, transmission electrodes ET and reception electrodes ER are disposed. The transmission electrode ET and the reception electrode ER are disposed to face the coupling electrode EC and the earth electrode EE of the scale 1. In other words, in FIG. 2, the coupling electrode EC and the earth electrode EE of the scale 1 are disposed on a surface facing a Z (+) direction of the plate-like member 1A, and the transmission electrode ET and the reception electrode ER of the detection head 2 are disposed on a surface facing a Z (−) direction of the plate-like member 2A. In FIG. 2, the transmission electrode ET and the reception electrode ER disposed on the surface of the plate-like member 2A facing the Z (−) direction are illustrated by a dashed line.

Figure 3:
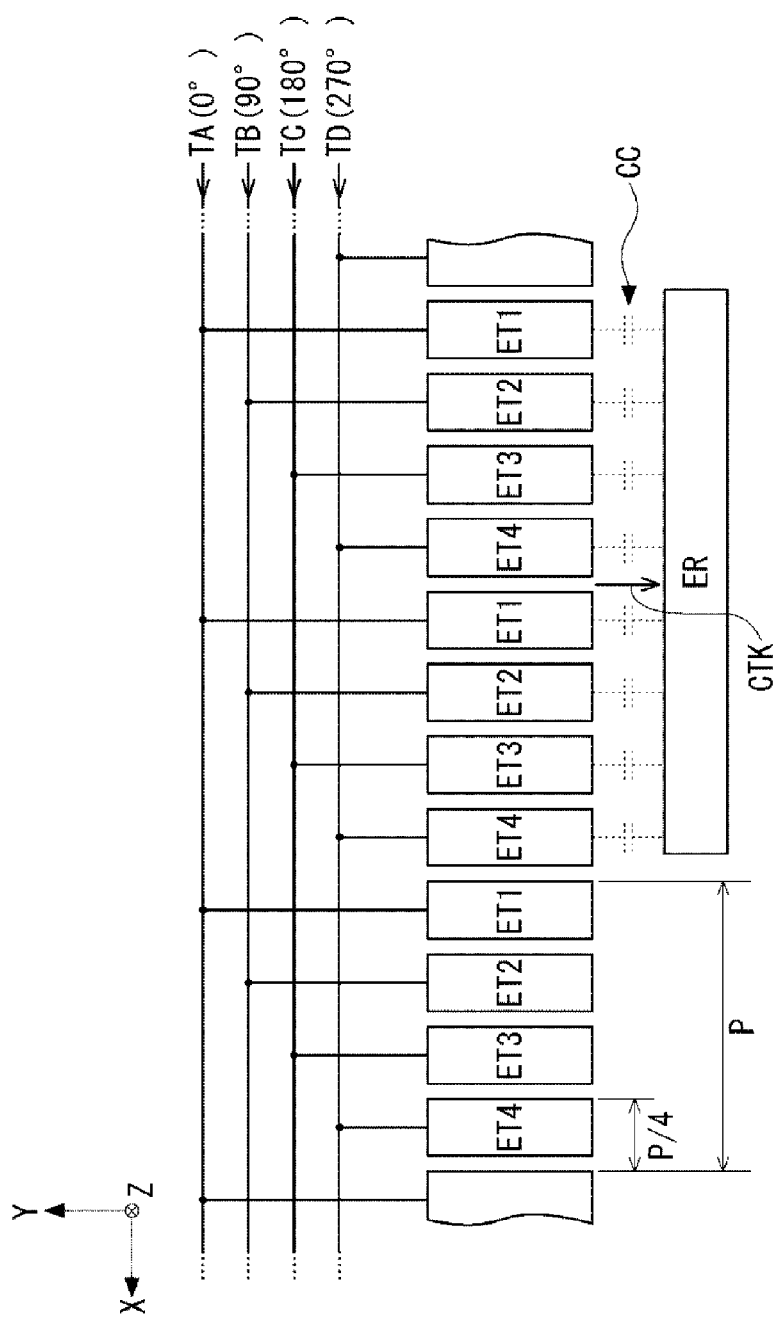
FIG. 3 illustrates an arrangement of electrodes of the detection head.

FIG. 3 illustrates the arrangement of the electrodes of the detection head. A plurality of the transmission electrodes ET are arranged in the X direction. In this example, four transmission electrodes ET1 to ET4 constitute one set and these sets are repeatedly arranged at the period P in order to transmit a four-phase signals. In this case, the transmission electrodes ET1 to ET4 are arranged in this order at a pitch of P/4.

Signals having phases different from each other are respectively input to the transmission electrodes ET1 to ET4 from the transmission signal output unit 4 as transmission signals. Here, the transmission signals TA(0°), TB(90°), TC(180°), and TD(270°), which are four-phase signals whose phases differ by 90°, are respectively input to the transmission electrodes ET1 to ET4.

The reception electrode ER is an electrode whose longitudinal direction is the X direction. The reception electrode ER is disposed at a position separated from the transmission electrodes ET1 to ET4 in the Y direction on the plate-like member 2A. In this example, a length of the reception electrode ER in the X direction, or in the measurement direction, is 2P.

When the transmission signals TA to TD are respectively input to the transmission electrodes ET1 to ET4, a voltage corresponding to the transmission signals TA to TD is induced in the reception electrode ER through the coupling electrodes EC. In this state, when the scale 1 is displaced relative to the detection head 2 in the X direction, capacitance between the transmission electrodes ET1 to ET4 and the reception electrode ER is repeatedly changed, and a signal having a phase corresponding to a displacement is received at the reception electrode ER. This induced voltage is output to the signal processing unit 3 as a received signal RS. After that, the displacement between the scale 1 and the detection head 2 can be detected by processing the received signal RS to derive a phase component.

The signal processing unit 3 samples the received signal RS at a predetermined frequency and generates a logic signal indicating an amplitude of the received signal. Then, the displacement between the scale 1 and the detection head 2 can be detected by detecting a phase of the logic signal.

As described above, each of the transmission paths of the transmission signals TA to TD is a path from each of the transmission electrodes ET1 to ET4 to the reception electrode ER through the coupling electrode EC. However, in the present configuration, as illustrated in FIG. 3, crosstalk CTK occurs through undesirable transmission paths due to coupling capacitance CC between the transmission electrodes ET1 to ET4 and the reception electrode ER. Therefore, since the crosstalk is mixed in the received signal RS, sampling of the received signal RS at the signal processing unit 3 is affected by the crosstalk.

Figure 4:
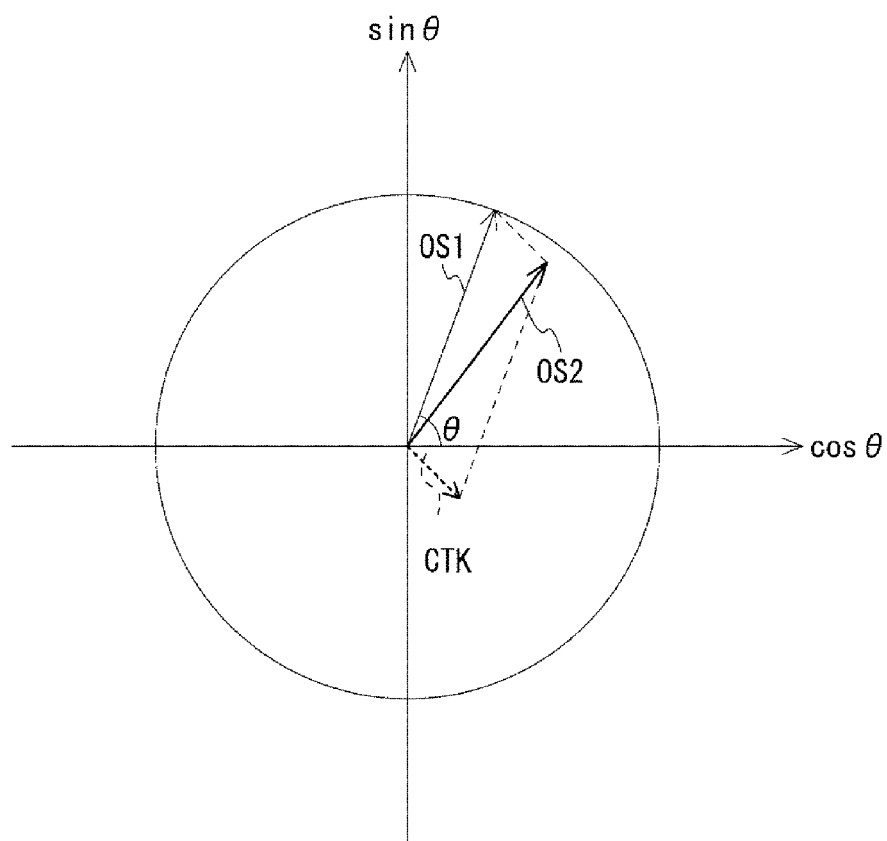
FIG. 4 illustrates a relation between crosstalk and a received signal by using a vector representation.
Figure 5:
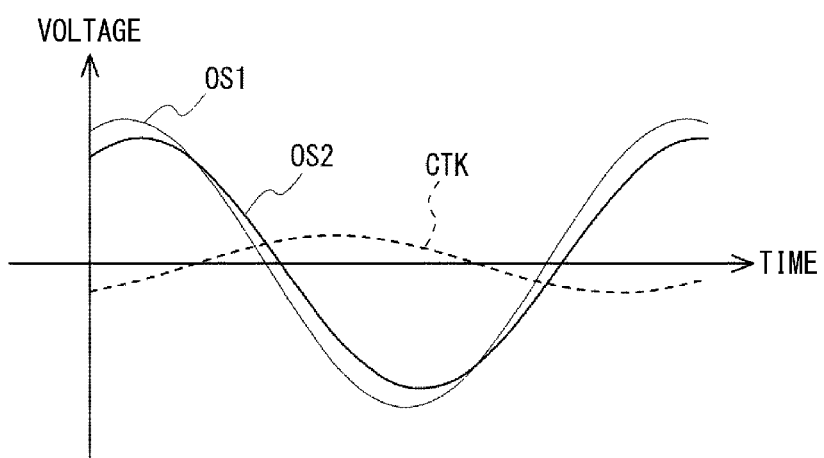
FIG. 5 illustrates waveforms of the crosstalk and the received signal.

FIG. 4 illustrates a relation between the crosstalk and the received signal by using a vector representation. FIG. 5 illustrates waveforms of the crosstalk and the received signal. In FIG. 4, a positive direction of a horizontal axis represents an amplitude of the transmission signal TA(0°), a positive direction of a vertical axis represents an amplitude of the transmission signal TB(90°), a negative direction of the horizontal axis represents an amplitude of the transmission signal TC(180°), and a negative direction of the vertical axis represents an amplitude of the transmission signal TD(270°).

For example, when a phase indicating a position of the scale 1 with respect to the detection head 2 is θ, a signal OS2 in which a distortion due to the crosstalk CTK is mixed is output as the received signal RS. On the other hand, a received signal without the distortion due to the crosstalk CTK, which should be essentially received, is a signal OS1 that is a signal in which the crosstalk CTK is removed from the signal OS2.

Thus, the signal processing unit 3 of the displacement detector 100 according to the present exemplary embodiment is configured to sample a signal after suppressing the crosstalk of the received signal RS, preferably after removing the crosstalk of the received signal RS.

Figure 6:
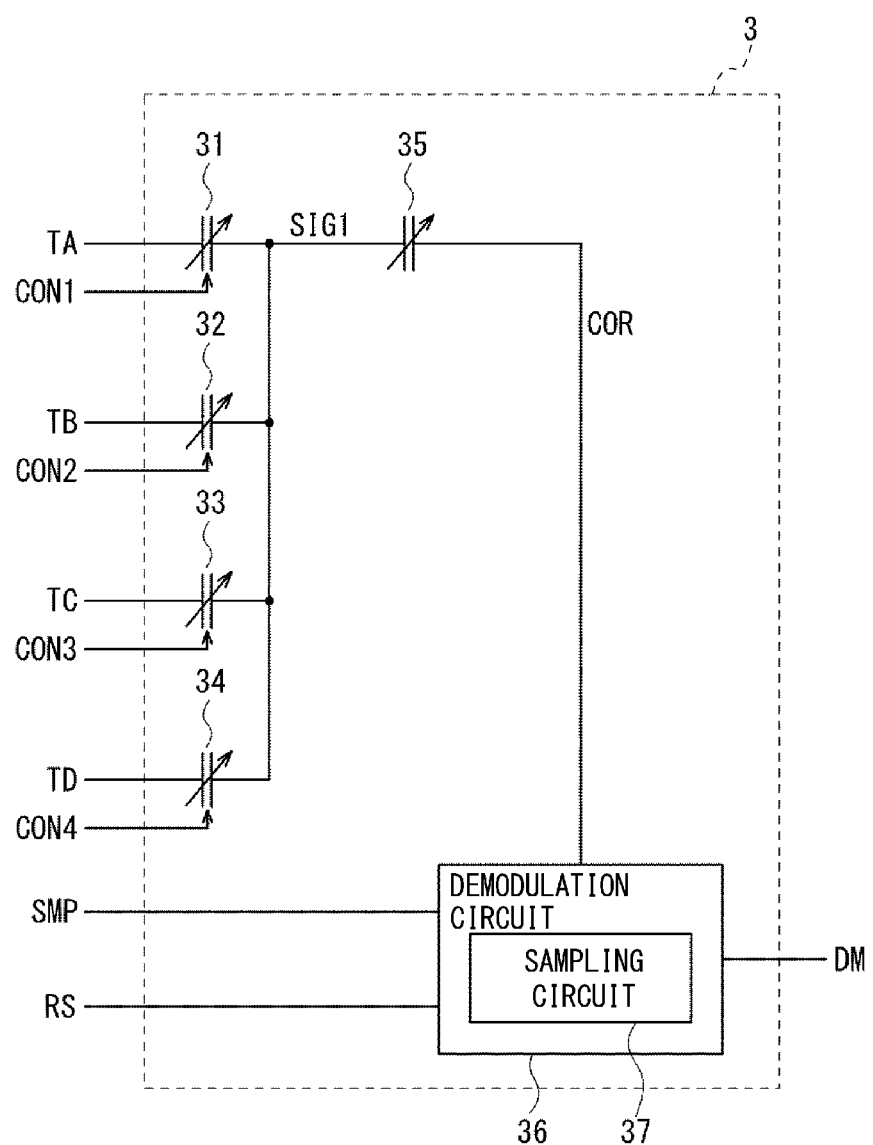
FIG. 6 schematically illustrates a configuration of a signal processing unit of the displacement detector according to the first exemplary embodiment.

Hereinafter, the signal processing unit 3 will be described in detail. FIG. 6 schematically illustrates a configuration of the signal processing unit 3 of the displacement detector 100 according to the first exemplary embodiment. The signal processing unit 3 includes phase adjustment variable capacitance units 31 to 34 that are phase adjustment units, an amplitude adjustment variable capacitance unit 35 that is an amplitude adjustment unit, and a demodulation circuit 36.

The transmission signals TA to TD are input to the phase adjustment variable capacitance units 31 to 34 from the transmission signal output unit 4, respectively. Capacitances of the phase adjustment variable capacitance units 31 to 34 can be controlled in response to provided control signals CON1 to CON4, respectively. Hereinafter, each of the control signals CON1 to CON4 is also referred to as a first control signal. Thus, the phase adjustment variable capacitance units 31 to 34 adjust voltages of the transmission signals TA to TD by capacitive voltage division, respectively. The adjusted signals are synthesized to generate a signal SIG1 having a phase opposite to a phase of a crosstalk component included in the received signal RS, and the generated signal is output to the amplitude adjustment variable capacitance unit 35.

Figure 7:
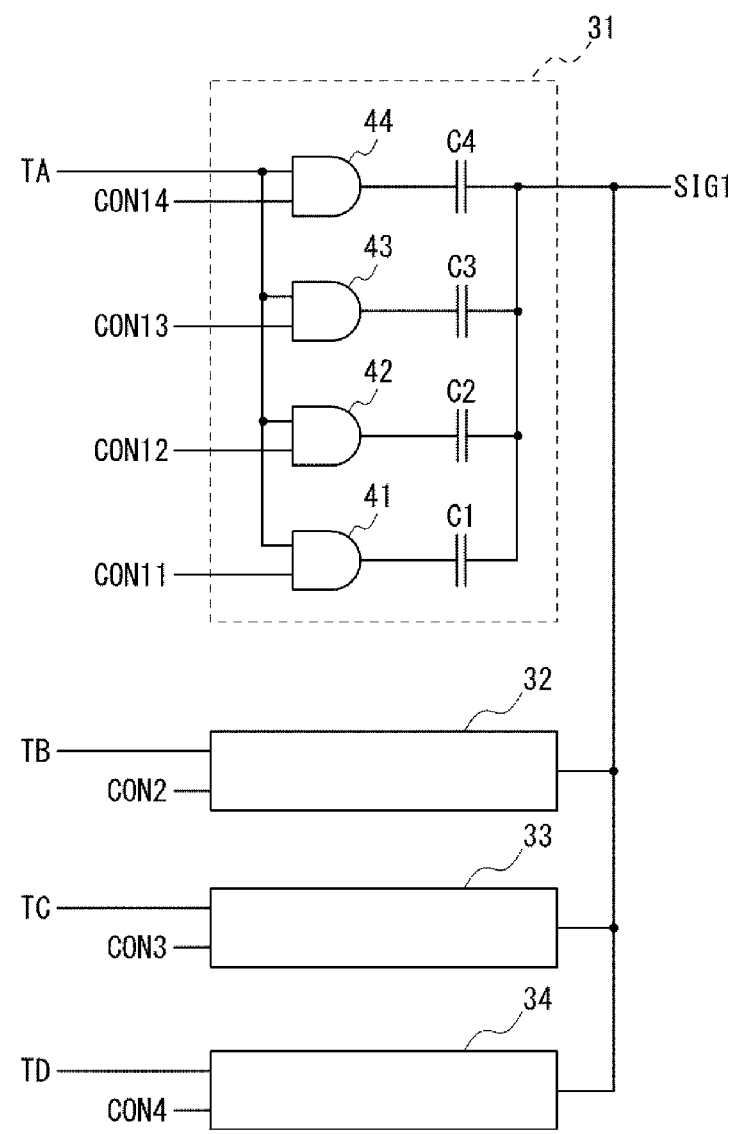
FIG. 7 illustrates a configuration example of a phase adjustment variable capacitance unit.

The phase adjustment variable capacitance units 31 to 34 will be specifically described. The phase adjustment variable capacitance units 31 to 34 may have the same configuration. Here, a configuration example of the phase adjustment variable capacitance unit 31 will be described as a representative. FIG. 7 illustrates the configuration example of the phase adjustment variable capacitance unit 31. The phase adjustment variable capacitance unit 31 includes first capacitors (capacitors C1 to C4) and first AND circuits (AND circuits 41 to 44). The capacitors C1 to C4 are capacitors having different capacitance values from each other.

The transmission signal, in this example, the transmission signal TA is input to one input of each of the AND circuits 41 to 44. A control signal is input to the other input of each of the AND circuits 41 to 44. Here, control signals CON11 to CON14 are input to the AND circuits 41 to 44, respectively. In other words, activation and inactivation of the AND circuits 41 to 44 are controlled by the control signals CON11 to CON14, respectively. For simplification, the control signals CON11 to CON14 are represented as the control signal CON1 in FIG. 6. Outputs of the AND circuits 41 to 44 are connected to the capacitors C1 to C4, respectively. As described above, since the capacitance values of the capacitors C1 to C4 are different from each other, an output value of the phase adjustment variable capacitance unit 31, or the voltage of the transmission signal TA, can be changed in 16 steps (4 bits) by the capacitive voltage division.

Because the phase adjustment variable capacitance units 32 to 34 are the same as the phase adjustment variable capacitance unit 31, descriptions of those will be omitted.

The transmission signals TA to TD, whose voltages are adjusted by the capacitive voltage division at the phase adjustment variable capacitance units 31 to 34, are synthesized and the phase-adjusted signal SIG1 is output.

Figure 8:
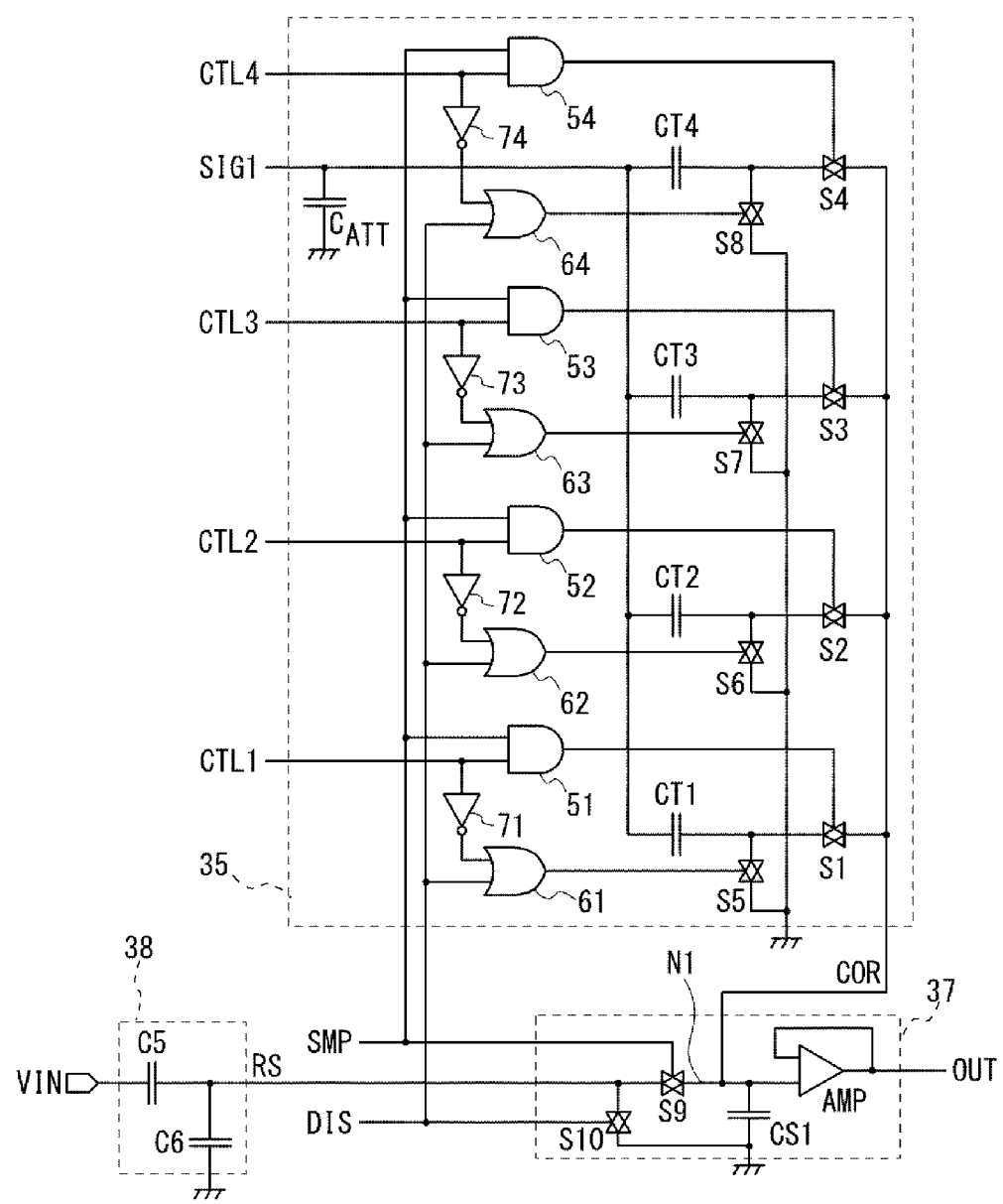
FIG. 8 schematically illustrates configurations of an amplitude adjustment variable capacitance unit and a sampling circuit.

The amplitude adjustment variable capacitance unit 35 outputs a signal generated by adjusting the amplitude of the signal SIG1 output from the phase adjustment variable capacitance units 31 to 34 as a crosstalk correction signal COR. FIG. 8 schematically illustrates configurations of the amplitude adjustment variable capacitance unit 35 and a sampling circuit 37.

The amplitude adjustment variable capacitance unit 35 includes an attenuation capacitor $C_{ATT}$, capacitors CT1 to CT4, AND circuits 51 to 54, OR circuits 61 to 64, inverters 71 to 74, and switches S1 to S8. The capacitors CT1 to CT4 are capacitors having different capacitance values. Hereinafter, each of the capacitors CT1 to CT4 is also referred to as a second capacitor. Each of the AND circuits 51 to 54 is also referred to as a second AND circuit. Each of the switches S1 to S4 is also referred to as a first switch and each of the switches S5 to S8 is also referred to as a second switch.

A sampling signal SMP is input to one input of each of the AND circuits 51 to 54. Control signals CTL1 to CTL4 are input to the other inputs of the AND circuits 51 to 54, respectively. Hereinafter, each of the control signals CTL1 to CTL4 is also referred to as a second control signal. A discharge signal DIS is input to one input of each of the OR circuits 61 to 64. The control signals CTL1 to CTL4 are input to inputs of the inverters 71 to 74, respectively. Outputs of the inverters 71 to 74 are connected to the other inputs of the OR circuits 61 to 64, respectively.

The signal SIG1 is input to one end of the attenuation capacitor $C_{ATT}$. In other words, the end of the attenuation capacitor $C_{ATT}$ to which the signal SIG1 is input is connected between a node, which is between the phase adjustment variable capacitance units 31 to 34 and the capacitors CT1 to CT4, and the ground. Thus, the signal SIG1 attenuated by the attenuation capacitor $C_{ATT}$ is input to the capacitors CT1 to CT4. The switches S1 to S4 are inserted between the other ends of the capacitors CT1 to CT4 and the demodulation circuit 36, respectively. The switches S1 to S4 are opened and closed in response to signals output from the AND circuits 51 to 54, respectively. The switches S5 to S8 are inserted between the other ends of the capacitors CT1 to CT4 and the ground. In other words, the switches S5 to S8 are inserted between the ends of the capacitors CT1 to CT4 to which the switches S1 to S4 are respectively connected and the ground. The switches S5 to S8 are opened and closed in response to signals output from the OR circuits 61 to 64, respectively.

The demodulation circuit 36 is configured as a circuit that demodulates the received signal RS to output a demodulated signal DM. The demodulation circuit 36 is configured as a circuit including the sampling circuit 37. The sampling circuit 37 is configured as a circuit that samples a signal generated by synthesizing the received signal RS and the crosstalk correction signal COR in response to the sampling signal SMP. Hereinafter, a configuration example of the sampling circuit 37 will be described.

In this example, it is assumed that the received signal RS is output from a circuit 38 to which a voltage VIN is applied. The circuit 38 is an equivalent circuit representing the reception electrode ER that receives the transmission signal, and the voltage VIN is a voltage input to the transmission electrode ET. The circuit 38 is represented as a circuit described below. In the circuit 38, a capacitor C5 is inserted between a terminal to which the voltage VIN is applied and an output terminal. Further, in the circuit 38, a capacitor C6 is inserted between a node, which is between the capacitor C5 and the output terminal, and the ground.

The sampling circuit 37 includes a signal detection capacitor CS1, switches S9 and S10, and an amplifier AMP. The received signal RS is input to one end of the switch S9 and the other end of the switch S9 is connected to a non-inverted input of the amplifier AMP. The switch S9 is opened and closed in response to the sampling signal SMP. The switch S10 is connected between the end of the switch S9 to which the received signal RS is input and the ground. The switch S10 is opened and closed in response to the discharge signal DIS.

The crosstalk correction signal COR output from the amplitude adjustment variable capacitance unit 35 is input to a node N1 between the non-inverted input of the amplifier AMP and the switch S9. The signal detection capacitor CS1 is inserted between the node N1 and the ground. An inverted input of the amplifier AMP is connected to an output of the amplifier AMP. In other words, the amplifier AMP constitutes a voltage follower. A signal OUT indicating a sampling result is output from the output terminal of the amplifier AMP. Although not illustrated, the signal OUT is demodulated and the demodulated signal is output as the demodulated signal DM.

For example, when the sampling signal is HIGH, a capacitance value of the amplitude adjustment variable capacitance unit 35 is determined according to the number of the switches closed in response to the control signals CTL1 to CTL4. In the sampling circuit 37, in response to the sampling signal SMP, the signal detection capacitor CS1 is charged by the signal generated by synthesizing the received signal RS and the crosstalk correction signal COR, and the charged voltage is sampled. When the discharge signal DIS is HIGH, the capacitors CT1 to CT4 of the amplitude adjustment variable capacitance unit 35 are simultaneously short-circuited and electric charge charged in the signal detection capacitor CS1 is discharged.

Figure 9:
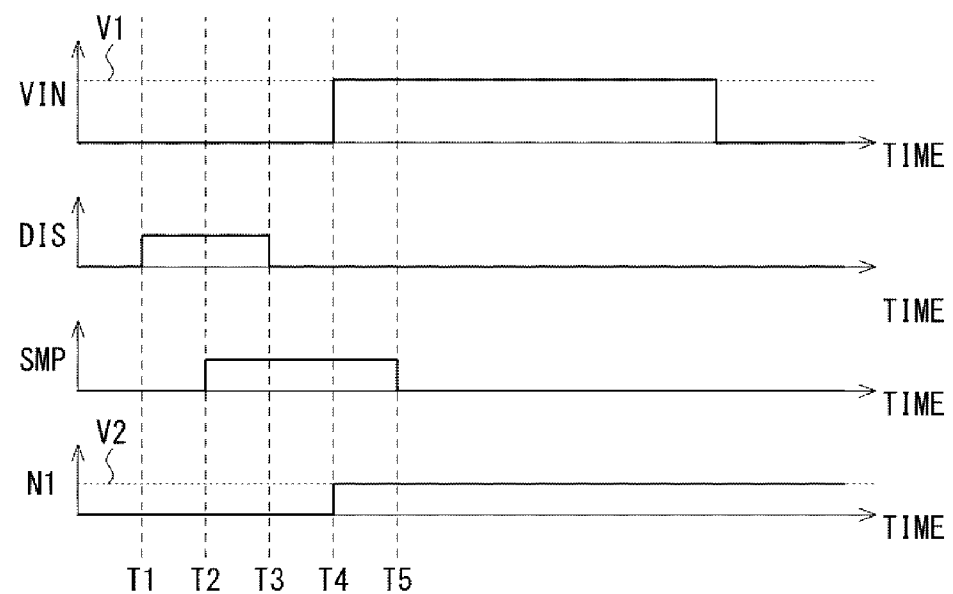
FIG. 9 illustrates a timing chart representing an operation example of the signal processing unit.

FIG. 9 illustrates a timing chart representing an operation example of the signal processing unit 3. In FIG. 9, when the voltage VIN becomes HIGH, the value of the voltage VIN is V1. For example, at a time before the voltage VIN is changed to HIGH, when the discharge signal DIS is changed from LOW to HIGH, the switch S10 is opened (Timing T1 in FIG. 9). After that, when the sampling signal SMP is changed from LOW to HIGH, the switch S9 is opened (Timing T2 in FIG. 9). Thus, the electric charge charged in the signal detection capacitor CS1 is discharged. Subsequently, when the discharge signal DIS is changed from HIGH to LOW, the switch S10 is closed (Timing T3 in FIG. 9). Thus, the signal detection capacitor CS1 is in a chargeable state. After that, when the voltage VIN is changed from LOW to V1, a voltage of the node N1 is changed from LOW to V2 (Timing T4 in FIG. 9). The voltage V2 at this moment is expressed by the following expression:

$$V2=C5/(C5+C6+CS1)*V1.$$

After that, when the sampling signal SMP is changed from HIGH to LOW, the switch S10 is closed (Timing T5 in FIG. 9). Thus, the voltage V2 of the node N1 is sampled and the sampled signal is output as the signal OUT indicating the sampling result is output.

Figure 10:
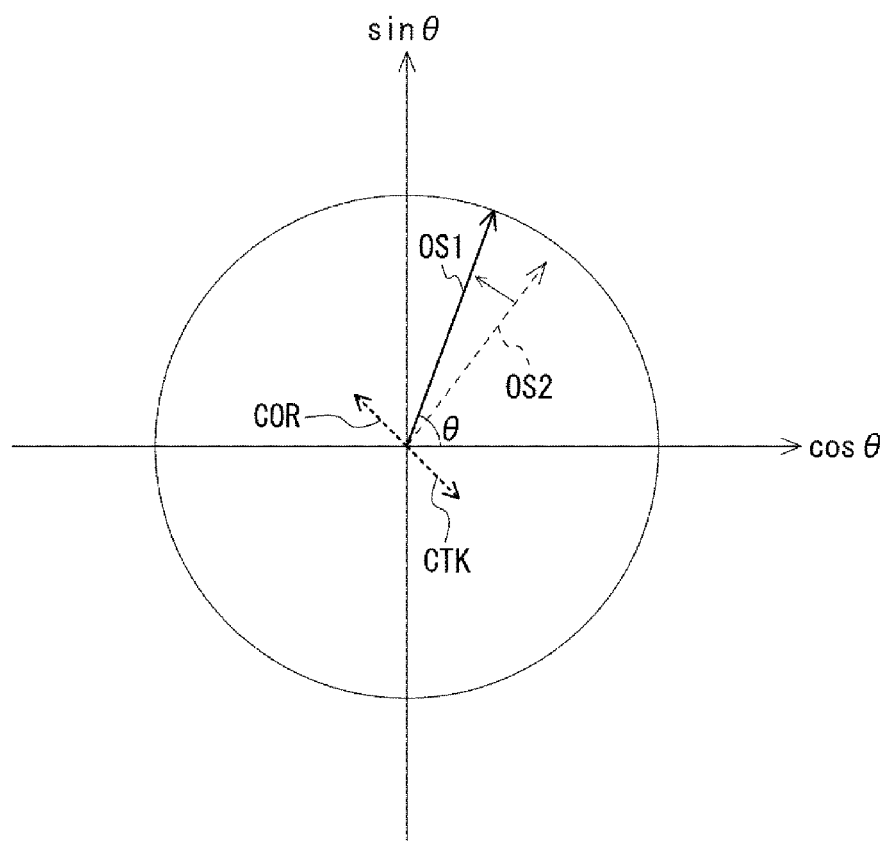
FIG. 10 illustrates a relation between the crosstalk, a crosstalk correction signal, and the received signal in the signal processing unit according to the first exemplary embodiment by using the vector representation.
Figure 11:
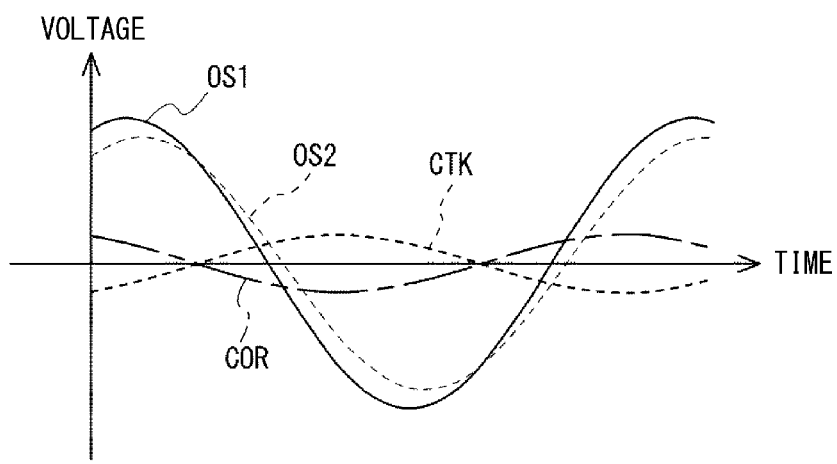
FIG. 11 illustrates waveforms of the crosstalk, the crosstalk correction signal, and the received signal in the signal processing unit according to the first exemplary embodiment.

Next, correction of the crosstalk by the signal processing unit 3 will be described. FIG. 10 illustrates a relation between the crosstalk, the crosstalk correction signal, and the received signal in the signal processing unit 3 according to the first exemplary embodiment by using the vector representation. FIG. 11 illustrates waveforms of the crosstalk, the crosstalk correction signal, and the received signal in the signal processing unit 3 according to the first exemplary embodiment. In FIG. 10, as in FIG. 4, a positive direction of a horizontal axis represents an amplitude of the transmission signal TA(0°), a positive direction of a vertical axis represents an amplitude of the transmission signal TB(90°), a negative direction of the horizontal axis represents an amplitude of the transmission signal TC(180°), and a negative direction of the vertical axis represents an amplitude of the transmission signal TD(270°).

In this example, as in FIG. 4, a phase and an amplitude of the signal OS1 is affected by the crosstalk CTK and thereby the distortion occurs in the signal OS1. As a result, as in FIG. 4, due to the distortion, the signal OS2 is output as the received signal RS. However, in the present configuration, the crosstalk correction signal COR having the phase opposite to a phase of the crosstalk CTK and the same amplitude as the crosstalk CTK is generated by the phase adjustment variable capacitance units 31 to 34 and the amplitude adjustment variable capacitance unit 35. The sampling circuit 37 samples the signal generated by synthesizing the received signal RS and the crosstalk correction signal COR. Therefore, as illustrated in FIG. 10, the crosstalk CTK is cancelled by the crosstalk correction signal COR having the phase opposite to the phase of the crosstalk CTK and the same amplitude as the crosstalk CTK. As a result, as illustrated in FIG. 10 and FIG. 11, the signal OS1 that is not affected by the crosstalk is sampled.

As described above, according to the present configuration, it is possible to achieve the displacement detector capable of suppressing or removing the crosstalk of the capacitive displacement detector.

In the displacement detector 100 according to the present exemplary embodiment, phase adjustment amounts of the phase adjustment variable capacitance units 31 to 34 and the amplitude adjustment amount of the amplitude adjustment variable capacitance unit 35 are predetermined. For example, an amplitude of the signal sampled by the sampling circuit 37 may be monitored by only the detection head without the scale, and the capacitance values of the phase adjustment variable capacitance units 31 to 34 and the amplitude adjustment variable capacitance unit 35 may be adjusted or calibrated to minimize the monitored amplitude. Therefore, when measuring the displacement after the adjustment, the crosstalk can be stably corrected.

In the present configuration, a phase adjustment of the transmission signal is carried out by the phase adjustment variable capacitance units 31 to 34 and an amplitude adjustment of the transmission signal is carried out by the amplitude adjustment variable capacitance unit 35. In other words, the phase adjustment of the transmission signal and the amplitude adjustment of the transmission signal are separately carried out. This is advantageous for achieving reduction of a circuit scale as compared to such method disclosed in Japanese unexamined patent publication No. 2-269908. The reason will be described below.

In Japanese unexamined patent publication No. 2-269908, an amplitude of each alternative voltage input to a transmission electrode is changed in 16 steps (4 bits) using four capacitors that have different capacitance values. In this case, a capacitance ratio of cancellation capacitors, or a value obtained by dividing the maximum capacitance value by the minimum capacitance value, is 16. In order to generate the crosstalk correction signal changed in 256 steps (8 bits) as in the case of the displacement detector 100 according to the first exemplary embodiment by such configuration, it is necessary to realize a capacitance ratio of 16 times as compared to the case of 4 bits. As a result, an area occupied by the capacitors greatly increases and the circuit scale also increases.

On the other hand, in the displacement detector 100 according to the first exemplary embodiment, since the 4-bit phase adjustment of the transmission signal and the 4-bit amplitude adjustment of the transmission signal are separately carried out, the total capacitance ratio is 16+16=32. Thus, in the present configuration, an area occupied by the capacitors can be ⅛ with respect to that of Japanese unexamined patent publication No. 2-269908. Therefore, it can be understood that it is advantageous in terms of reducing the circuit area and thereby reducing cost.

As described above, according to the present configuration, the crosstalk can be removed with high accuracy by precisely adjusting a phase and an amplitude of the crosstalk correction signal with the simple configuration that can be realized at low cost.

Second Exemplary Embodiment

Next, a displacement detector according to a second exemplary embodiment will be described. In the displacement detector according to the present exemplary embodiment, a configuration of an amplitude adjustment variable capacitance unit of the signal processing unit is different from that of the displacement detector 100 according to the first exemplary embodiment. An amplitude adjustment variable capacitance unit 39 according to the second exemplary embodiment will be described below.

Figure 12:
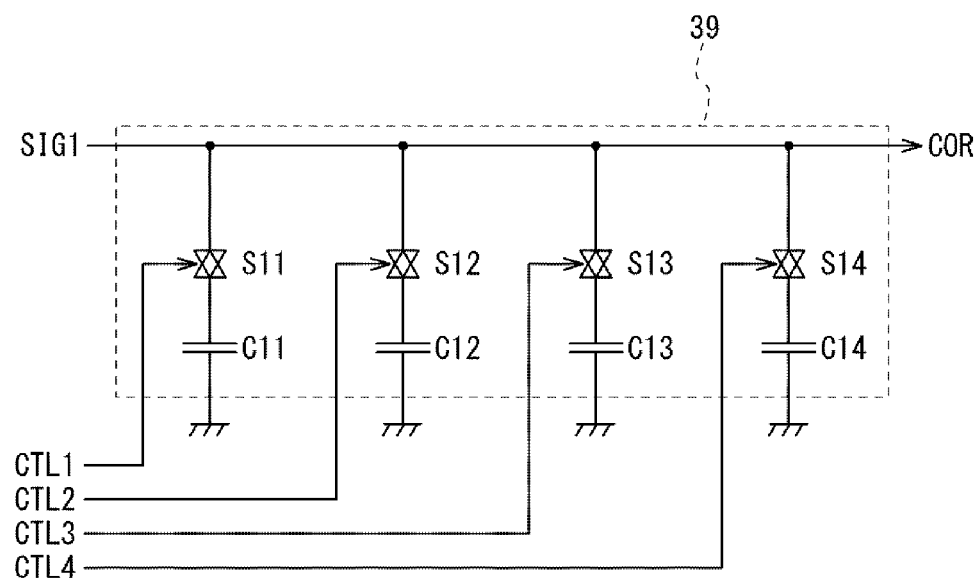
FIG. 12 schematically illustrates a configuration of an amplitude adjustment variable capacitance unit according to a second exemplary embodiment.

FIG. 12 schematically illustrates a configuration of the amplitude adjustment variable capacitance unit 39 according to the second exemplary embodiment. The amplitude adjustment variable capacitance unit 39 includes capacitors C11 to C14 and switches S11 to S14. In this example, capacitance values of the capacitors C11 to C14 are different from each other. The signal SIG1 output from the phase adjustment variable capacitance units 31 to 34 is input to one end of each of the switches S11 to S14. The capacitors C11 to C14 are inserted between the other ends of the switches S11 to S14 and the ground, respectively. The control signals CTL1 to CTL4 are provided to the switches S11 to S14 to control opening and closing of the switches S11 to S14, respectively. Hereinafter, each of the capacitors C11 to C14 is also referred to as a third capacitor. Each of the switches S11 to S14 is also referred to as a third switch. Each of the control signals CTL1 to CTL4 in the second exemplary embodiment is also referred to as a third control signal.

According to the present configuration, it is possible to change the capacitance values of the capacitors for attenuating the signal SIG1 in 16 steps by controlling the opening and closing of the switches S11 to S14. As a result, a signal generated by attenuating the signal SIG1 can be provided to the demodulation circuit 36 as the crosstalk correction signal COR.

As described above, according to the present configuration, as in the first exemplary embodiment, it is possible to achieve the displacement detector capable of suppressing or removing the crosstalk of the capacitive displacement detector.

In the amplitude adjustment variable capacitance unit 39, a part of the capacitors C11 to C14 may be used as the attenuation capacitor $C_{ATT}$ of the demodulation circuit 36 according to the first exemplary embodiment. The attenuation capacitor $C_{ATT}$ may be disposed apart from the capacitors C11 to C14.

Other Exemplary Embodiments

Note that the present invention is not limited to the aforementioned exemplary embodiments and may be changed as appropriate without departing from the spirit of the present invention. For example, although it has been described that the phase adjustment variable capacitance units 31 to 34 have the same configuration, all or part of the phase adjustment variable capacitance units 31 to 34 may have different configurations.

For example, the configurations of the phase adjustment variable capacitance units 31 to 34 are not limited to the configuration described with reference to FIG. 7. Other configurations capable of adjusting the phase of the transmission signal may be appropriately adopted. For example, as described above, the example in which the phase of the transmission signal is changed in 16 steps has been described. However, the phase of the transmission signal may be adjusted in multiple steps other than 16 steps by appropriately changing one or both of the number of the AND circuits and the number of the capacitors. The phase of the transmission signal may be changed not in a step-like manner but continuously.

For example, the configurations of the amplitude adjustment variable capacitance units 35 and 39 are not limited to those described above. Other configurations capable of adjusting the amplitude of the signal may be appropriately adopted. For example, in the above description, the example in which the amplitude of the signal is changed in 16 steps has been described. However, the amplitude of the signal may be adjusted in multiple steps other than 16 steps by appropriately changing a part or all of the number of the AND circuits, the number of the OR circuits, the number of the switches, and the number of the capacitors. The amplitude of the signal may be changed not in a step-like manner but continuously.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A displacement detector, the displacement detector being a capacitive displacement detector, the displacement detector comprising:
   phase adjustment units configured to generate a signal whose phase is adjusted from a transmission signal, the transmission signal being output from a transmission signal output unit, the transmission signal being transmitted from a transmission electrode to a reception electrode through a coupling electrode disposed in the scale, the transmission electrode and the reception electrode being disposed in a detection head, the coupling electrode being disposed in a scale, the transmission signal being received by the reception electrode, the detection head detecting a displacement between the detection head and the scale based on the received signal;
   an amplitude adjustment unit configured to adjust an amplitude of the signal whose phase is adjusted by the phase adjustment unit to generate a crosstalk correction signal; and
   a demodulation unit configured to sample a signal generated by synthesizing the crosstalk correction signal and the received signal and to demodulate the sampled signal.

2. The displacement detector according to claim 1, wherein
   the phase adjustment units adjust a voltage of the transmission signal by capacitive voltage division based on a predetermined condition and synthesizes the adjusted voltages to generate a signal having a phase opposite to a phase of crosstalk included in the received signal, and
   the amplitude adjustment unit causes an amplitude of the signal generated by the phase adjustment units to coincide with an amplitude of the crosstalk based on a predetermined condition to generate the crosstalk correction signal.

3. The displacement detector according to claim 1, wherein
   the phase adjustment unit comprises a plurality of first capacitors, one end of the first capacitor being connected to an input of the amplitude adjustment unit, and the number of the first capacitors the other ends of which receive the transmission signal in the plurality of first capacitors are controlled in response to a first control signal.

4. The displacement detector according to claim 3, wherein capacitance values of the plurality of first capacitors are different from each other.

5. The displacement detector according to claim 1, wherein
   the amplitude adjustment unit comprises a plurality of second capacitors, and
   the amplitude adjustment unit is configured to be capable of changing the number of the second capacitors connected between the demodulation unit and the amplitude adjustment unit in the plurality of second capacitors.

6. The displacement detector according to claim 5, comprising a plurality of first switches inserted between the amplitude adjustment units and the plurality of second capacitors or between the demodulation unit and the plurality of second capacitors, the plurality of first switches being configured to be opened and closed in response to a second control signal, wherein
   the number of the first switches to be closed in the plurality of first switches is controlled in response to the second control signal.

7. The displacement detector according to claim 6, wherein the demodulation unit samples a voltage of a signal detection capacitor that is charged by the signal generated by synthesizing the received signal and the crosstalk correction signal in response to a sampling signal, and discharges charge that is charged in the signal detection capacitor in response to a discharge signal.

8. The displacement detector according to claim 7, comprising a plurality of second switches connected to a demodulation unit side end of each of the plurality of second capacitors and the ground, wherein
   the plurality of second switches are simultaneously opened in response to the discharge signal, or the number of the second switches to be closed in the plurality of second switches can be controlled in response to the second control signal.

9. The displacement detector according to claim 8, comprising:
   a plurality of AND circuits, the second control signal being input to one end of the AND circuit, the sampling signal being input to the other end of the AND circuit, and opening and closing of the plurality of first switches being respectively controlled in response to output signals the plurality of AND circuits; and
   a plurality of OR circuits, the discharge signal being input to one end of the OR circuit, a reversed signal of the second control signal being input to the other end of the OR circuit, and opening and closing of the plurality of second switches being respectively controlled in response to output signals of the plurality of OR circuits.

10. The displacement detector according to claim 1, wherein
    the amplitude adjustment unit comprises:
    a plurality of third switches, opened and closed in response to a third control signal, one end of each of the plurality of third switches being connected to an output of the phase adjustment unit; and
    a plurality of third capacitors, one end of each of the plurality of third switches being respectively connected to the other ends of the plurality of third switches, and the other ends of the plurality of third switches being connected to the ground, the number of third switches to be closed in the plurality of third switches is controlled in response to the third control signal.

\* \* \* \* \*